(12) United States Patent
Takahashi

(10) Patent No.: US 10,949,147 B2
(45) Date of Patent: Mar. 16, 2021

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Kouichi Takahashi, Kumagaya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/691,460

(22) Filed: Nov. 21, 2019

(65) Prior Publication Data

US 2020/0174725 A1  Jun. 4, 2020

(30) Foreign Application Priority Data

Nov. 30, 2018  (JP) .............................. JP2018-225254
Nov. 30, 2018  (JP) .............................. JP2018-225255

(51) Int. Cl.
*G06F 15/00* (2006.01)
*G06F 3/12* (2006.01)
*G06K 1/00* (2006.01)

(52) U.S. Cl.
CPC ............ *G06F 3/1253* (2013.01); *G06F 3/123* (2013.01); *G06F 3/1204* (2013.01); *G06F 3/1205* (2013.01); *G06F 3/1225* (2013.01); *G06F 3/1274* (2013.01)

(58) Field of Classification Search
CPC .... G06F 3/1253; G06F 3/1204; G06F 3/1205; G06F 3/1225; G06F 3/123; G06F 3/1274
USPC ................................ 358/1.15, 1.14, 1.13, 1.1
See application file for complete search history.

(56) References Cited

U.S. PATENT DOCUMENTS

| | | | |
|---|---|---|---|
| 8,335,002 B2 | 12/2012 | Kawara | |
| 2011/0194146 A1* | 8/2011 | Sato | G06F 3/1263 358/1.15 |
| 2012/0081731 A1 | 4/2012 | Suzuki | |
| 2015/0199161 A1 | 7/2015 | Gutnik et al. | |
| 2015/0201111 A1* | 7/2015 | Takasaki | G06F 3/1285 358/1.9 |
| 2017/0024202 A1* | 1/2017 | Tokuda | G06F 8/65 |
| 2017/0279998 A1 | 9/2017 | Nakagawa | |
| 2020/0133600 A1* | 4/2020 | Kanamori | G06F 3/1285 |

FOREIGN PATENT DOCUMENTS

JP  2015-508921 A  3/2015
RU  2608467 C2  1/2017

* cited by examiner

*Primary Examiner* — Douglas Q Tran
(74) *Attorney, Agent, or Firm* — Canon U.S.A., Inc. IP Division

(57) ABSTRACT

In a case where a registration state of a printing apparatus in operating system (OS) standard print software and a registration state of the printing apparatus in print conversion software do not match each other, an information processing apparatus performs a process for matching between a registration state of a print queue of the printing apparatus in the OS standard print software and the registration state of the printing apparatus in the print conversion software.

16 Claims, 15 Drawing Sheets

FIG.3
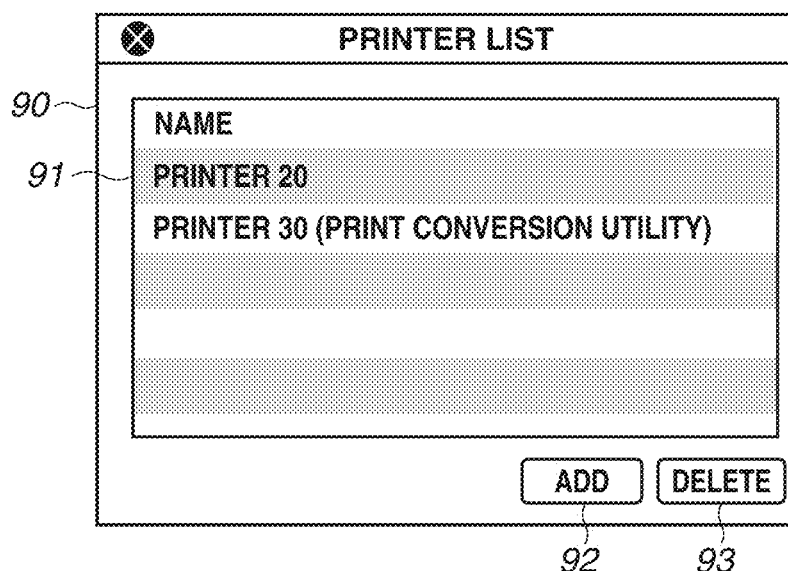
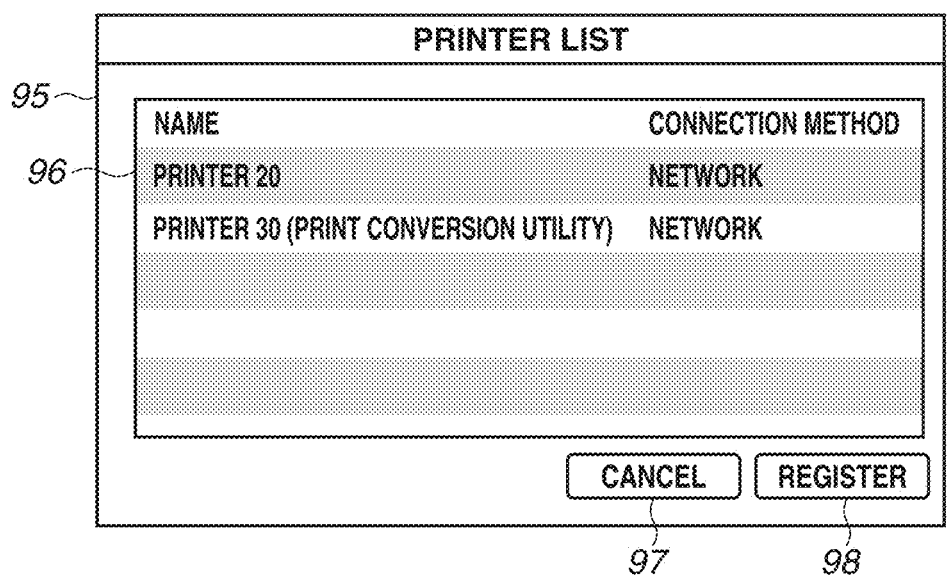

FIG.6

PRINT QUEUE OF PRINTER 30 FOR OS STANDARD PRINT FUNCTION IS NOT REGISTERED.

IF PRINT QUEUE FOR OS STANDARD PRINT FUNCTION IS NOT REGISTERED, PRINTING CAN BE PERFORMED ONLY USING IMAGE FILE.

YOU CAN REGISTER PRINT QUEUE FOR OS STANDARD PRINT FUNCTION BY FOLLOWING PROCEDURE.
1. PLEASE OPEN "PRINTER REGISTRATION" SCREEN.
2. PLEASE SELECT PRINTER 30 (PRINT CONVERSION UTILITY) AND PRESS "REGISTER" BUTTON.

[ OK ]

110  111

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium.

Description of the Related Art

An example of conventional print environments includes a personal computer (hereinafter referred to as a "PC") and a printer that are connected to each other. In such a print environment, printing according to a technique discussed in Japanese Unexamined Patent Application Publication No. 2015-508921 is performed using a print function included as standard in an operating system (OS) (hereinafter referred to as an "operating system (OS) standard print function") without using printer-specific software which is provided by a printer vendor. The printer-specific software is occasionally referred to as a "printer driver".

Japanese Unexamined Patent Application Publication No. 2015-508921, however, does not discuss information management in a case where a printer incapable of interpreting print data in a predetermined format supported by the OS standard print function is connected to the PC. In a case where a user uses a printer incapable of interpreting print data in the predetermined format supported by the OS standard print function, the operability may decrease.

SUMMARY OF THE INVENTION

According to an aspect of the present invention, an information processing apparatus comprising a registration unit configured to register a printing apparatus connected to the information processing apparatus in print conversion software that generates print data based on print data generated by operating system (OS) standard print software, wherein the OS standard print software generates the print data in a predetermined format in response to an instruction from an application, a reception unit configured to receive first print data in the predetermined format via the OS standard print software, a generation unit configured to generate second print data in another format different from the predetermined format based on the first print data; and a control unit configured, in a case where a registration state of the printing apparatus in the OS standard print software and a registration state of the printing apparatus in the print conversion software do not match each other, to perform a process for matching between a registration state of a print queue of the printing apparatus in the OS standard print software and the registration state of the printing apparatus in the print conversion software.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIG. 3 is a diagram illustrating examples of screens of an operating system (OS) print system.

FIG. 6 is a diagram illustrating a guide dialog provided by the print conversion utility.

DESCRIPTION OF THE EMBODIMENTS

With reference to the attached drawings, suitable exemplary embodiments f the present invention will be described in detail below. The following exemplary embodiments do not limit the present invention according to the appended claims, and not all the combinations of the features described in the exemplary embodiments are essential for a method for solving the issues in the present invention.

Figure 1:
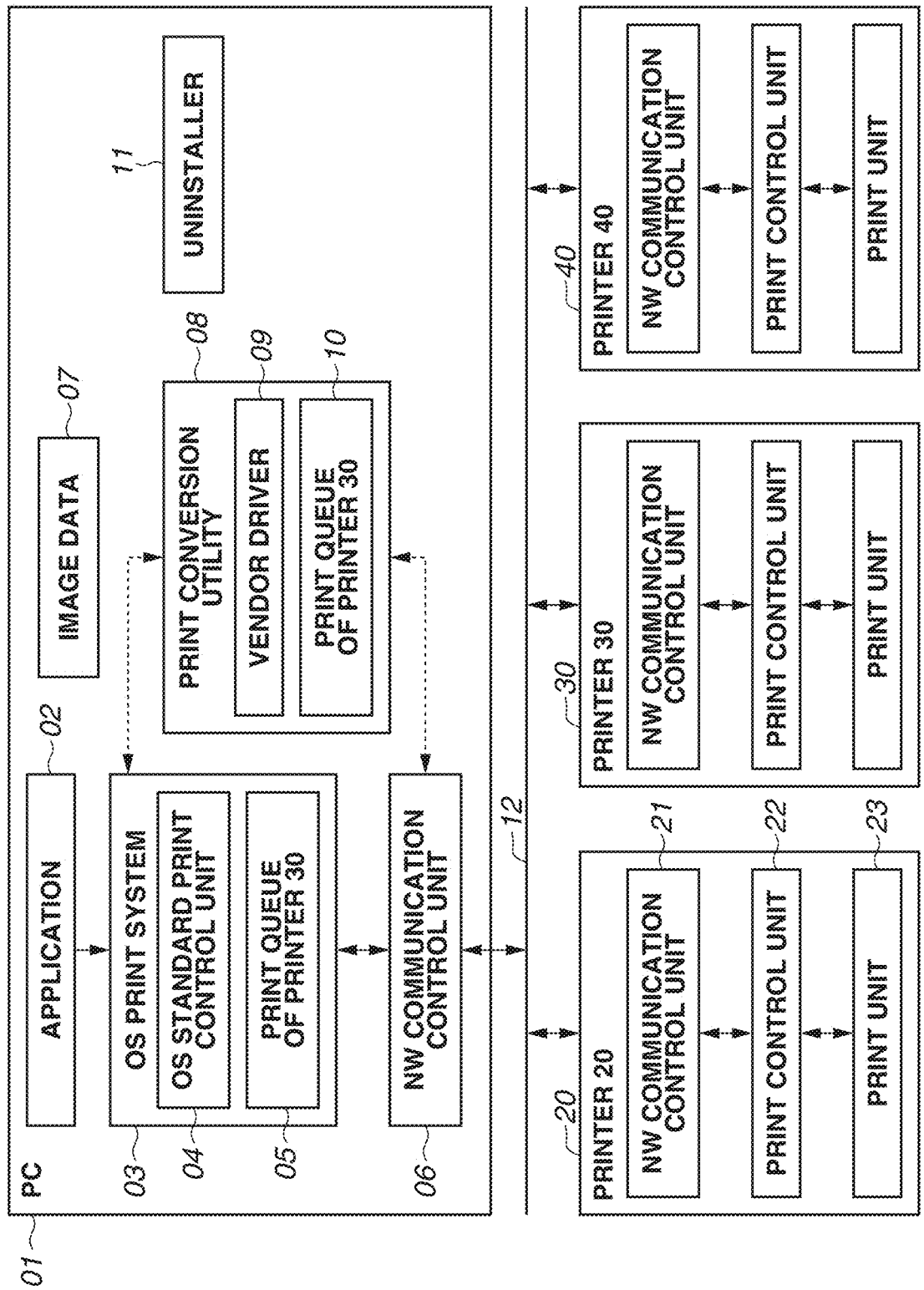
FIG. 1 is a diagram illustrating an overall configuration of a printing system according to the present exemplary embodiment.

FIG. 1 is a diagram illustrating the overall configuration of a printing system according to a first exemplary embodiment. A personal computer (PC) 01 is connected to printers 20, 30, and 40 via a network 12, and the PC 01 and the printers 20, 30, and 40 can communicate with each other. While a local area network (LAN) is used as the network 12 in the present exemplary embodiment, a wide area network (WAN) may be used. The network 12 can serve as both a wired connection and a wireless connection. Wired and wireless connections may be used together. The PC 01 controls the printers 20 to 40 connected to the PC 01 via the network 12.

Although not illustrated in FIG. 1, an operating system (OS) is incorporated in the PC 01 and manages blocks in the PC 01. The PC 01 has a hardware configuration (FIG. 15) that is included in a general information processing apparatus.

Figure 15:
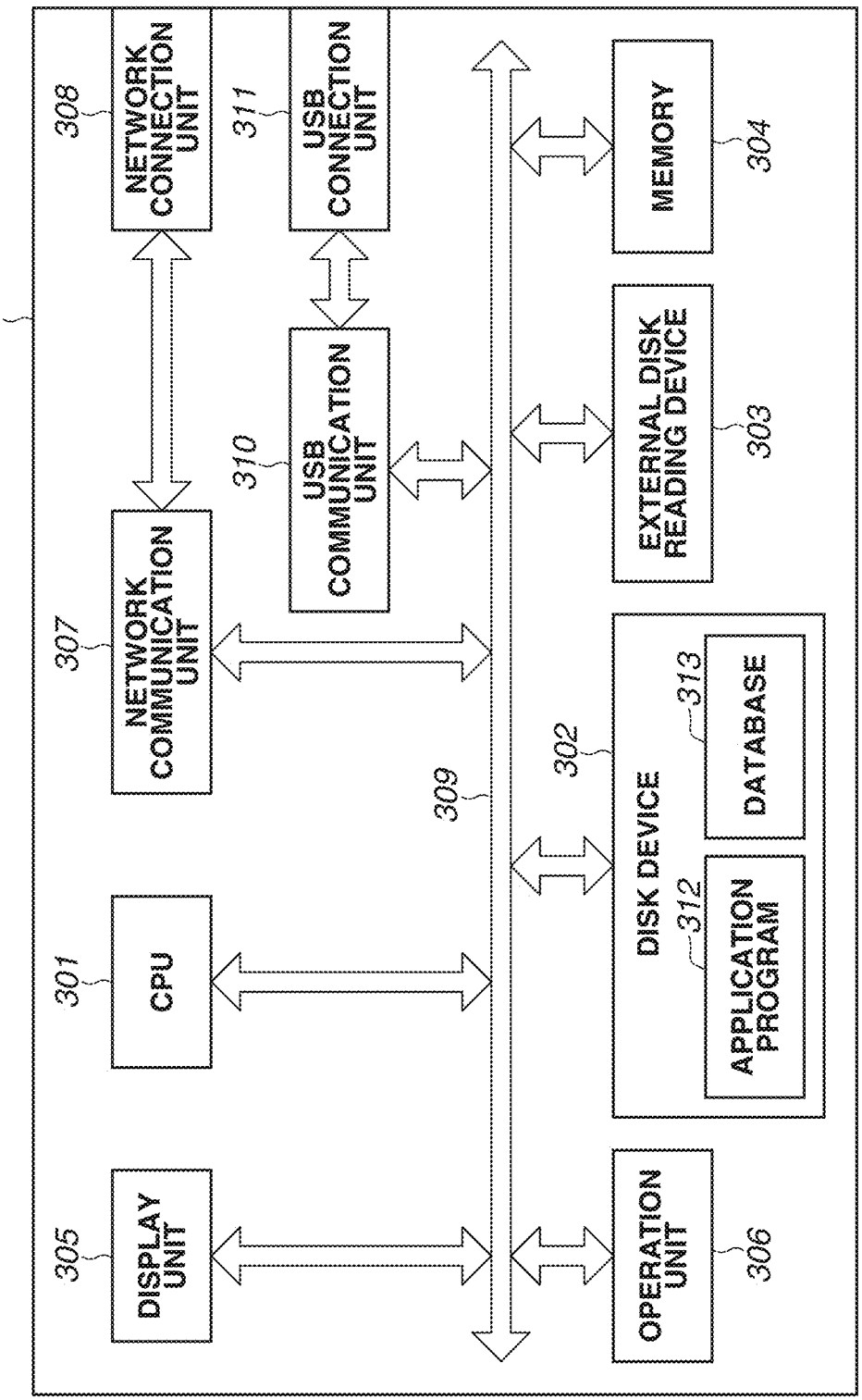
FIG. 15 is a hardware configuration diagram of an information processing apparatus.

FIG. 15 is a block diagram illustrating the hardware configuration of the PC (information processing apparatus) 01. A central processing unit (CPU) 301 is a central arithmetic unit and controls the following components. A disk device 302 stores an application program 312, a database 313, and an operating system (OS), and various files that are read by the CPU 301. An external disk reading device 303 is a device for reading information in a file stored in an external storage medium such as a Secure Digital (SD) card. A memory 304 is composed of a random-access memory (RAM), and the CPU 301 temporarily stores or buffers data in the memory 304, when necessary. A display unit 305 includes, for example, a liquid crystal display (LCD) and displays various pieces of information. An operation unit 306 includes a keyboard and a mouse with which a user performs various input operations. A network communication unit 307 connects to a network, such as the Internet, via a network connection unit 308 and performs various types of communication. The network communication unit 307 supports a wired LAN and a wireless LAN. The network connection unit 308 serves as a connector for connecting a wired LAN cable in a case of using the wired LAN and serves as an antenna in a case of using the wireless LAN. The network connection unit 308 may have functions for both a wired LAN and a wireless LAN. A Universal Serial Bus (USB) communication unit 310 is connected to various peripheral apparatuses via a USB connection unit 311 and performs various types of communication. The above components are connected to each other via a bus 309. In the present exemplary embodiment, macOS (registered trademark) is used as the OS incorporated in the PC 01.

The software configuration of the PC 01 is described below. The PC 01 includes an application 02, an OS print system 03, a network (NW) communication control unit 06, a print conversion utility 08, and an uninstaller 11 for the print conversion utility 08. The PC 01 can execute functions of these components. The uninstaller 11 may be incorporated in the print conversion utility 08. The OS print system 03 including an OS standard print control unit 04 is a module included in the OS as a standard module. In other words, the user does not need to individually install the OS print system 03 and the OS standard print control unit 04. The OS print system 03 and the OS standard print control unit 04 are installed together with the installation of the OS. Thus, the OS print system 03 including the OS standard print control unit 04 is also occasionally referred to as "OS standard print software". A print queue 05 of the printer 30 and the OS standard print control unit 04 are managed by the OS print system 03. The print conversion utility 08 including a vendor driver 09 is used in printing using a printer incapable of interpreting print data in a predetermined format supported by an OS standard print function and is installed on the PC 01 according to an instruction from the user. The OS print system 03 sequentially processes a print instruction received from the application 02 as a job. If the user instructs printing of application data created by the application 02, the user instruction is submitted to the OS print system 03 as a print job. If the OS print system 03 receives the print job, the OS standard print control unit 04 generates print data in the format supported by the OS standard print function. If a printer capable of interpreting print data in the format supported by the OS standard print function is selected when the print instruction is submitted from the application 02, the OS print system 03 transmits the print data generated by the OS standard print control unit 04 to the printer. With this configuration, even if an installation process according to an instruction from the user is not performed, for example, the OS print system 03 can operate on the PC 01. In the present exemplary embodiment, the OS standard print function is also occasionally referred to as a "predetermined print function". In the present exemplary embodiment, a printer incapable of interpreting print data in the format supported by the OS standard print function is also occasionally referred to as an "unsupported printer". A printer capable of interpreting print data in the format supported by the OS standard print function is also occasionally referred to as a "supported printer".

Next, a description is given of processing in a case where a printer selected when the print instruction is submitted from the application 02 is an unsupported printer. After the print data in the format supported by the OS standard print function is generated by the OS standard print control unit 04, the OS print system 03 sends the print data to the print conversion utility 08. After converting the print data into print data in a vendor-specific format, the print conversion utility 08 transmits the print data in the vendor-specific format to the printer via the NW communication control unit 06. That is, the print data generated by the OS standard print control unit 04 and the print data generated by the print conversion utility 08 are different from each other.

Aside from the above, the print conversion utility 08 can also convert image data 07 specified using a "file printing" screen 70 described below in FIG. 2 into print data in a vendor-specific format and transmit the print data in the vendor-specific format to a printer via the NW communication control unit 06.

Each of the printers 20, 30, and 40 includes an NW communication control unit 21, a print control unit 22, and a print unit 23. The print control unit 22 receives print data from the PC 01 via the NW communication control unit 21, and controls the print unit 23 to execute printing based on the print data. While printing is performed by an inkjet method in the present exemplary embodiment, another method such as an electrophotographic method may be used.

If a supported printer is selected, the user can easily perform printing without using the print conversion utility 08. If, on the other hand, an unsupported printer is selected, printing is achieved using the print conversion utility 08.

When the print conversion utility 08 is used via the application 02, two print queues, namely the print queue 05 for the OS standard print function for receiving a print instruction from the application 02 and a print queue 10 for the print conversion utility 08, are registered. If these two print queues are not registered, printing cannot be performed using the print conversion utility 08 via the application 02.

Figure 2:
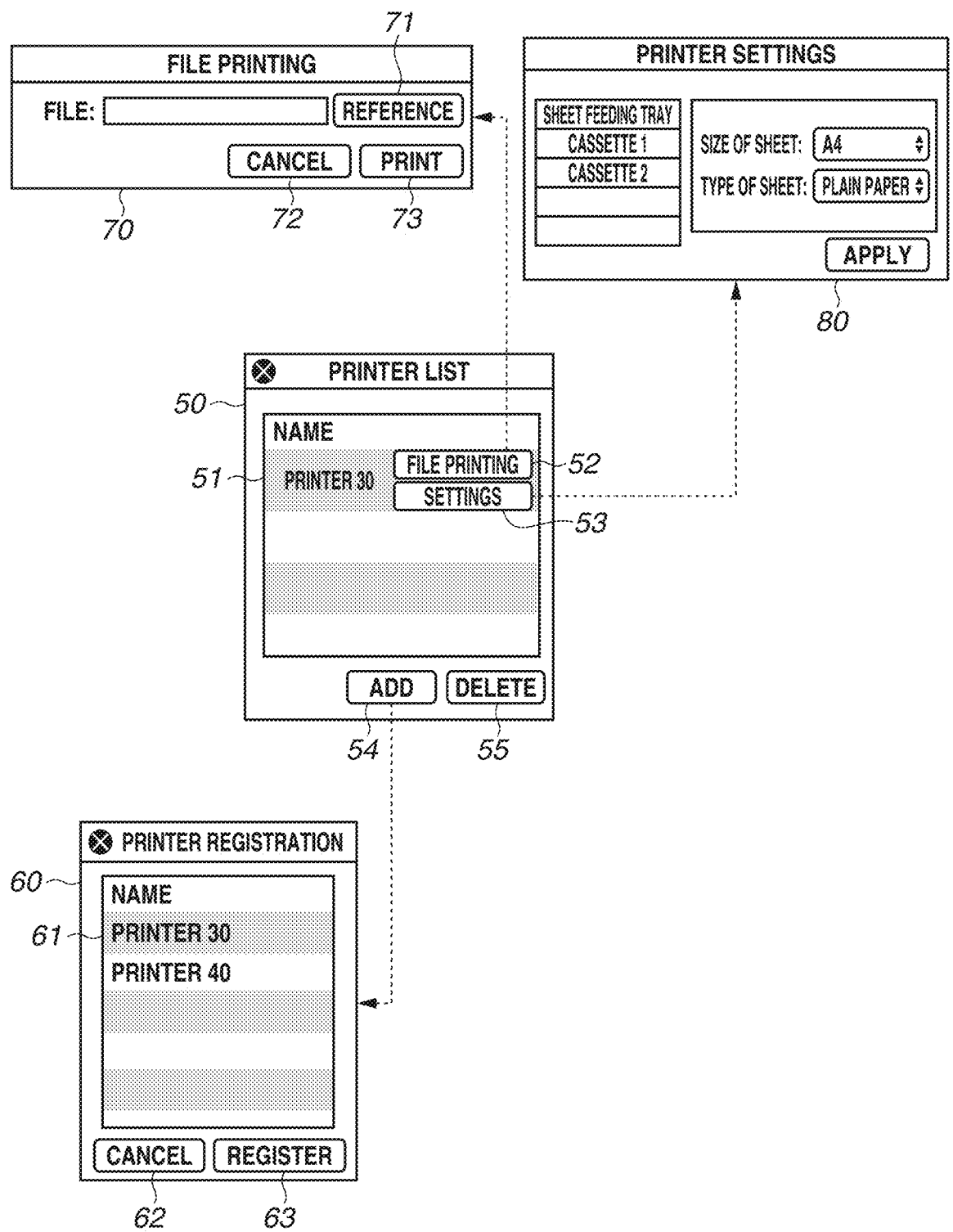
FIG. 2 is a diagram illustrating examples of screens of a print conversion utility.

The print conversion utility 08 can generate print data of the image data 07 specified using the "file printing" screen 70 in FIG. 2. While the print queue 10 for the print conversion utility 08 is registered to print the image data 07 specified on the "file printing" screen 70, the print queue 05 for the OS standard print function is not necessary.

When the print conversion utility 08 is installed, the uninstaller 11 for the print conversion utility 08 is installed together. To uninstall the print conversion utility 08, an uninstallation process is performed by starting the uninstaller 11.

In the present exemplary embodiment, the printer 20 is a supported printer, and the printers 30 and 40 are unsupported printers. More specifically, the printer 20 can interpret print data generated by the OS standard print control unit 04. In a case where printing is performed using the printer 30 via the application 02, both the print queue 05 for the OS standard print function and the print queue 10 for the print conversion utility 08 need to be registered. That is, in a case where the application 02 is used to instruct the printer 30 to perform printing, print data is transmitted to the printer 30 via the OS print system 03 and the print conversion utility 08. In other words, the printers 30 and 40 can interpret print data generated by the print conversion utility 08.

A description is given of an example of a process in which the user registers the print queue 10 for the print conversion utility 08.

FIG. 2 is a diagram illustrating examples of screens provided by the print conversion utility 08. A "printer list" screen 50 displays names 51 of printers registered in the print conversion utility 08, a "file printing" button 52 for directly printing the image data 07, and a "settings" button 53 for setting a printer. The "printer list" screen 50 also displays an "add" button 54 for registering a printer, and a "delete" button 55 for deleting a printer. If the user presses the "file printing" button 52, a "file printing" screen 70 is displayed. The user presses a "reference" button 71 and specifies the image data 07 to be printed. Then, if the user presses a "print" button 73, the print conversion utility 08 converts the image data 07 into print data in a vendor-specific format and transmits the print data in the vendor-specific format to the printer 30. If the user presses a "cancel" button 72, the "file printing" screen 70 is closed without performing printing.

If the user presses the "settings" button 53 on the "printer list" screen 50, the print conversion utility 08 opens a "printer settings" screen 80. If the user presses the "add" button 54, the print conversion utility 08 displays a "printer registration" screen 60.

The "printer registration" screen 60 includes a printer list 61 and displays information about unsupported printers connected to the PC 01 in the printer list 61. In the present exemplary embodiment, the printers 30 and 40 are displayed. The print conversion utility 08 stores printer information about unsupported printers in advance. Then, among the printers included in the printer information, unsupported printers connected to the PC 01 are displayed in the printer list 61. The print conversion utility 08 may acquire ability information about a printer connected to the PC 01 and determine an unsupported printer based on the ability information.

If the user presses a "register" button 63, a selected printer is registered in the print conversion utility 08. In the present exemplary embodiment, the printer 30 is already registered in the print conversion utility 08. If the printer is registered in the print conversion utility 08, the print conversion utility 08 acquires ability information from the printer as an operation target. Then, if the OS print system 03 transmits a request to acquire the ability information to the print conversion utility 08, the print conversion utility 08 receives the acquisition request for the ability information. Thus, the print conversion utility 08 adds, to the ability information to be returned to the OS print system 03, support information that indicates the support of the OS standard print function and is generated within the print conversion utility 08 based on the ability information acquired from the printer and returns the resulting information to the OS print system 03. In this process, the print queue 10 for the print conversion utility 08 is registered.

The print conversion utility 08 can also register the print queue 05 for the OS standard print function in the OS print system 03. In the present exemplary embodiment, however, the print conversion utility 08 does not register the print queue 05 in the OS print system 03. The OS print system 03 registers the print queue 05. The detailed description will be given below. If the user presses the "delete" button 55, the print queue of a selected printer for of the print conversion utility 08 is deleted from the print conversion utility 08. The name of the printer is also deleted from the printer list 50.

Next, a description is given of a process in which the OS print system 03 registers the print queue 05. FIG. 3 is a diagram illustrating a "printer list" screen 90 provided by the OS print system 03. The OS print system 03 includes a printer list 91 for adding or deleting a printer capable of printing. The OS print system 03 displays, in the printer list 91, all printers that can be selected when printing is performed. If the user selects a printer in the printer list 91 and presses a "delete" button 93, the OS print system 03 deletes a print queue of the selected printer and also deletes the name of the selected printer from the printer list 91. If the user presses an "add" button 92, the OS print system 03 displays a "printer registration" screen 95. The OS print system 03 displays supported printers connected to the PC 01 via the network 12 in a registered printer list 96. The OS print system 03 acquires, from the printers 20 to 40 connected to the PC 01 or the print conversion utility 08, the names of the printers and ability information including support information about support of the OS standard print function. Then, the OS print system 03 displays the names of supported printers and connection methods in the registered printer list 96. In the present exemplary embodiment, the printer 30 is an operation target of the print conversion utility 08. The print conversion utility 08 returns, to the OS print system 03, ability information obtained by adding "print conversion utility" to the name acquired from the printer 30. In the present exemplary embodiment, the identification information to be added is "print conversion utility". Alternatively, another piece of information may be added. Since the print conversion utility 08 returns the ability information about the printer 30 that is an unsupported printer, the OS print system 03 specifies the printer 30 as a display target in the registered printer list 96.

Based on the ability information acquired from the print conversion utility 08, the OS print system 03 displays "printer 30 (print conversion utility)" as the name of the printer 30 and "network" as a connection method in the registered printer list 96. If the user selects a printer in the registered printer list 96 and presses a "register" button 98, the OS print system 03 creates and registers the print queue 05 of the selected printer for the OS standard print function. Then, the OS print system 03 displays the selected printer in the printer list 91 and closes the "printer registration" screen 95. If the user presses a "cancel" button 97, the OS print system 03 closes the "printer registration" screen 95 without registering a printer, in the present exemplary embodiment, a print queue of the supported printer 20 and the print queue 05 of the printer 30 to which print data is transmitted via the print conversion utility 08 are registered in the OS print system 03.

Figure 4:
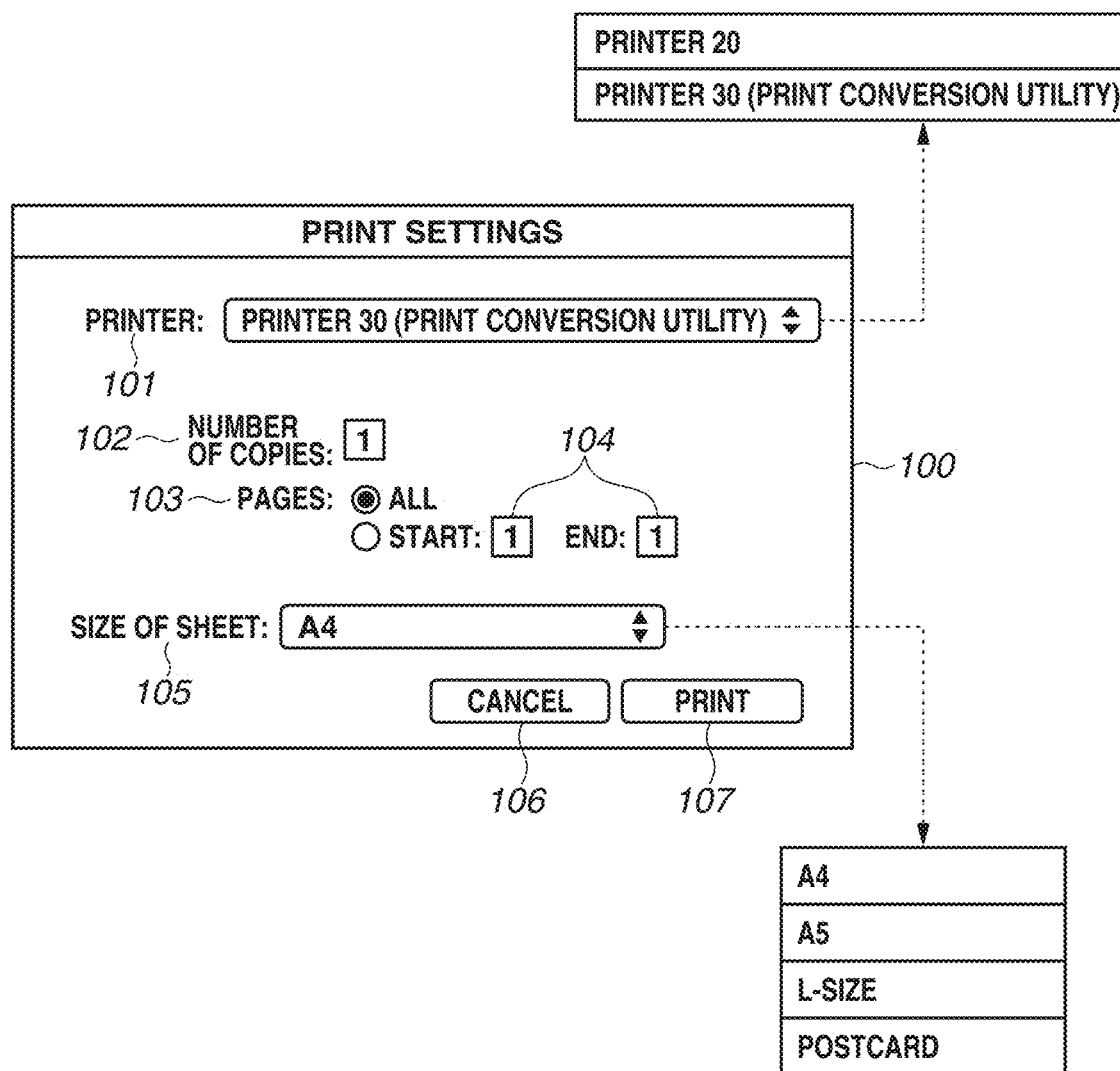
FIG. 4 is a diagram illustrating a "print settings" screen of the OS print system.

FIG. 4 is a diagram illustrating a "print settings" screen of the OS print system 03. The OS print system 03 includes a "print settings" screen 100 that is used to print application data created by the application 02. The user can set a printer for printing in a printer selection menu 101. The OS print system 03 displays, as a printer that can be selected, a printer capable of printing that is added to the "printer list" screen 90 in FIG. 3. In the present exemplary embodiment, the printer 20 that is a supported printer and the printer 30 to which print data is transmitted via the print conversion utility 08 are registered as printers capable of printing and are displayed as selection candidates in the printer selection menu 101. The user can set the number of copies to be printed in a number-of-copies setting field 102. The user can set pages to be printed, using a page setting radio button 103 and a page specifying field 104. The user can set the sheet size to be used in printing in a sheet size setting menu 105. The user can set any of sheet sizes including A4, A5, L-size, and postcard that can be used by the printer selected in the printer selection menu 101. If the user presses a "print" button 107, a print job based on the settings on this screen is submitted to the OS print system 03, and this screen is closed, if the user presses a "cancel" button 106, a print job is not submitted to the OS print system 03, and this screen is closed.

Next, a description is given of a process in which, when e user deletes the print queue 05, registered in the OS print system 03, of the printer 30 to which print data is transmitted via the print conversion utility 08, the user is prompted to register the print queue 05 again.

Figure 5:
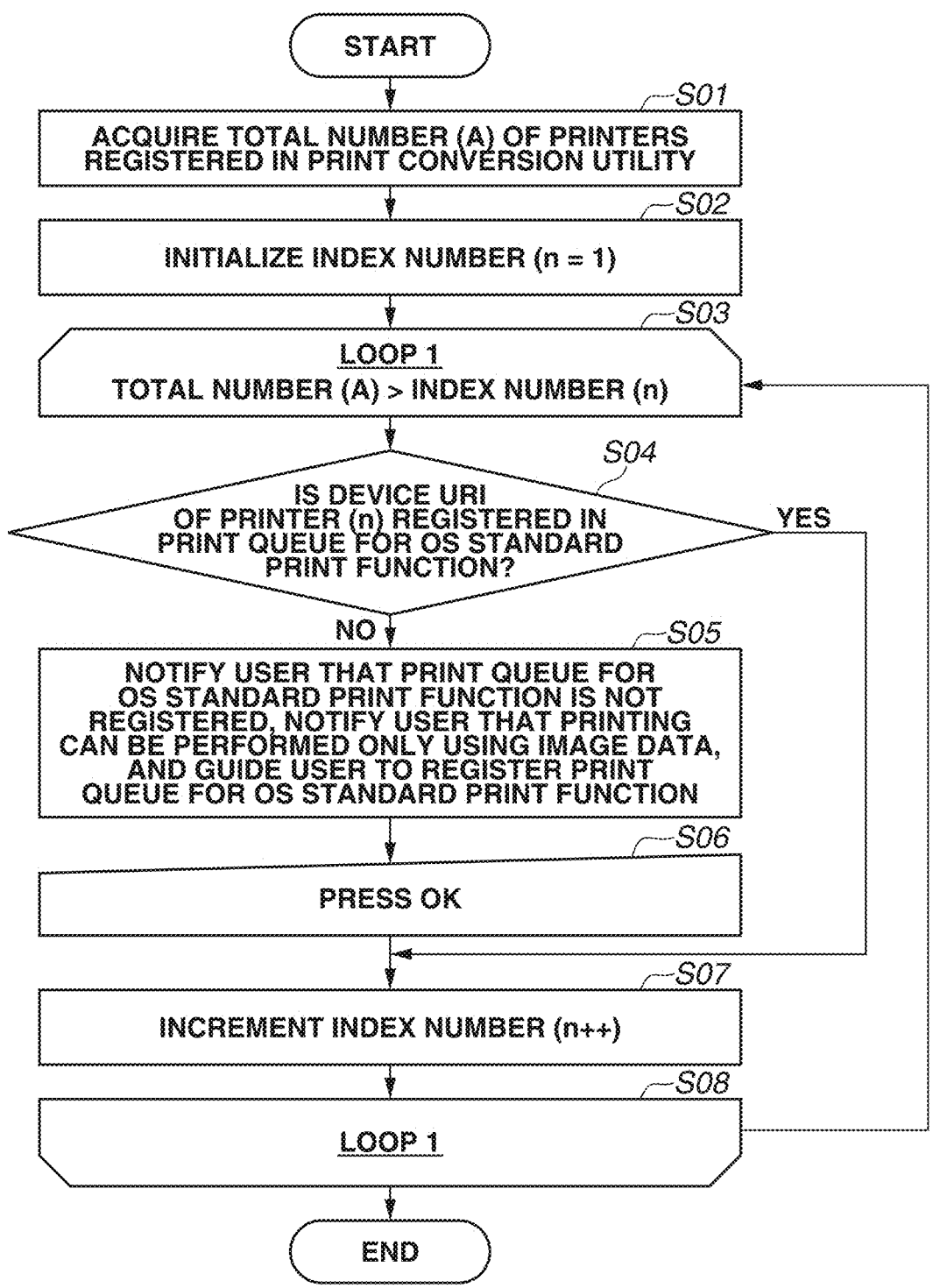
FIG. 5 is a flowchart illustrating an operating process of the print conversion utility.

FIG. 5 is a flowchart illustrating the operating process of the print conversion utility 08. Flowcharts described in the present invention are achieved by the CPU 301 reading a program related to the flowcharts from the memory 304 and executing the program. The flowchart in FIG. 5 is started by the user starting the print conversion utility 08. The print conversion utility 08 is started by the user operating an icon of the print conversion utility 08 on a screen of the PC 01.

In step S01, the print conversion utility 08 acquires the total number (A) of printers registered in the print conversion utility 08. In step S02, the print conversion utility 08 initializes an index number (n=1). In step S03, the print conversion utility 08 starts as many loops as the total number of printers.

In step S04, the print conversion utility 08 determines whether the device Uniform Resource Identifier (URI) of an n-th printer is registered in the print queue 05 for the OS standard print function. Step S04 is achieved as follows. For example, the print conversion utility 08 acquires from the OS print system 03 the device URIs of all print queues registered. In the OS print system 03. Then, the print conversion utility 08 determines whether the device URI of the n-th printer is included in the device UR is acquired from the OS print system 03. In a case where it is determined that the device URI of the n-th printer is not included in the device URIs acquired from the OS print system 03, the print conversion utility 08 determines that the print queue 05 for the OS standard print function is not registered (NO in step S04), and the processing proceeds to step S05. While device URIs are described as the information to be used in the present exemplary embodiment, another piece of identification information may be used. For example, a universally unique identifier (UUID) may be used.

In step S05, the print conversion utility 08 notifies the user that the print queue 05 for the OS standard print function is not registered, also notifies the user that printing can be performed only using the image data 07 specified on the "file printing" screen 70 in FIG. 2, and guides the user to register the print queue 05 for the OS standard print function. Specifically, the print conversion utility 08 displays a guide dialog 110 in FIG. 6. While the information in the notification and the guide in step S05 are the above described pieces of information according to the present exemplary embodiment, the user may be at least guided through the operating procedure for registering the print queue 05 for the OS standard print function. Alternatively, the user may be simply notified that the print queue 05 for the OS standard print function is not registered.

In step S06, in a case where an "OK" button 111 is pressed on the screen in FIG. 6, then in step S07, the print conversion utility 08 increments the index number, and the processing returns from step S08 to step S03.

When the print queue 05 is not registered in the OS print system 03 in the first place, the processing in FIG. 5 may be executed to prompt the user to register the print queue 05.

As described above, in the present exemplary embodiment, the print conversion utility 08 determines whether the print queue 05 for the OS standard print function corresponding to a printer managed by the print conversion utility 08 is registered. Then, in a case where it is determined that the print queue 05 for the OS standard print function corresponding to the printer managed by the print conversion utility 08 is not registered, the print conversion utility 08 guides the user to register the print queue 05 for the OS standard print function. That is, in the state where an unsupported printer (e.g., the printer 30) managed by the print conversion utility 08 is not displayed as a selection candidate in the printer selection menu 101 on the "print settings" screen 100 displayed according to an instruction from the application 02, step S07 is executed. By performing an operation according to this guide, the user can easily register the print queue 05 for the OS standard print function. As a result, both the print queue 10 for the print conversion utility 08 and the print queue 05 for the 05 print system 03 are registered, and the user can perform printing using the printer 30.

Next, a second exemplary embodiment of the present invention is described in the first exemplary embodiment, in a case where the print queue 05 of a printer to which print data is transmitted via the print conversion utility 08 is not registered for the OS print system 03, the user manually registers the print queue 05 for the OS print system 03 according to the procedure in FIG. 6. In a process according to the second exemplary embodiment, the print queue 05 is registered without the user manually performing an operation.

In the present exemplary embodiment, the differences from the first exemplary embodiment are described. In the present exemplary embodiment, the print conversion utility 08 can register, in the OS print system 03, the print queue 05 for the OS print system 03 of a printer registered using the "printer registration" screen 60 of the print conversion utility 08 in FIG. 2.

Figure 7:
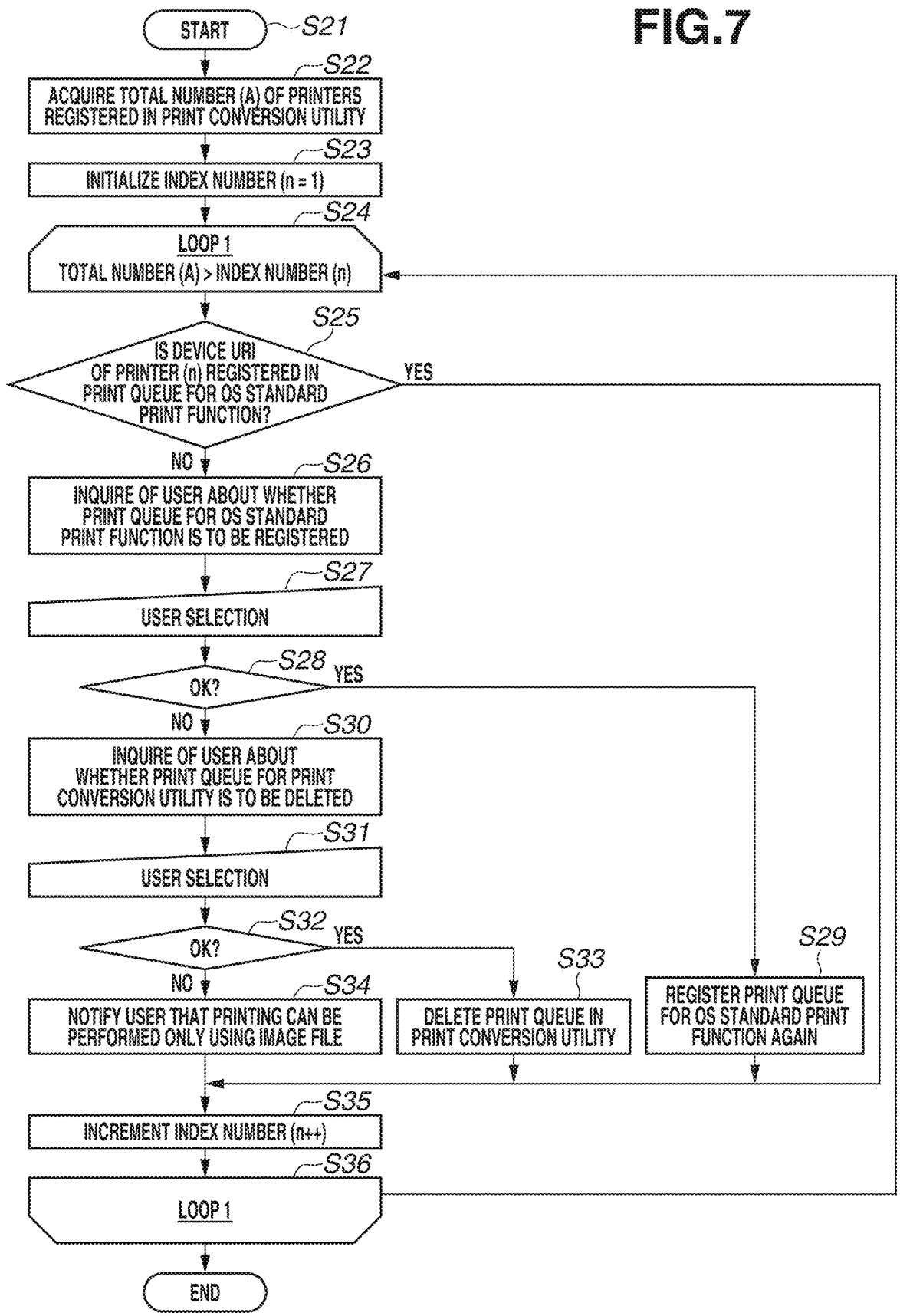
FIG. 7 is a flowchart illustrating an operating process of a print conversion utility.

FIG. 7 is a flowchart illustrating the operating process of the print conversion utility 08 according to the present exemplary embodiment, Steps S22 to S25, S35, and S36 are similar to steps S01 to S04, S07, and S08, respectively, in FIG. 5, and therefore are not described.

In a case where the print conversion utility 08 determines in step S25 that the device URI of the n-th printer is not registered in the OS print system 03 (NO in step S25), the processing proceeds to step S26. In step S26, the print conversion utility 08 notifies the user that the print queue 05 for the OS standard print function is not registered, and inquires of the user about whether the print queue 05 is to be registered in the OS print system 03. Specifically, the print conversion utility 08 displays a guide dialog 120 in FIG. 8.

Figure 8:
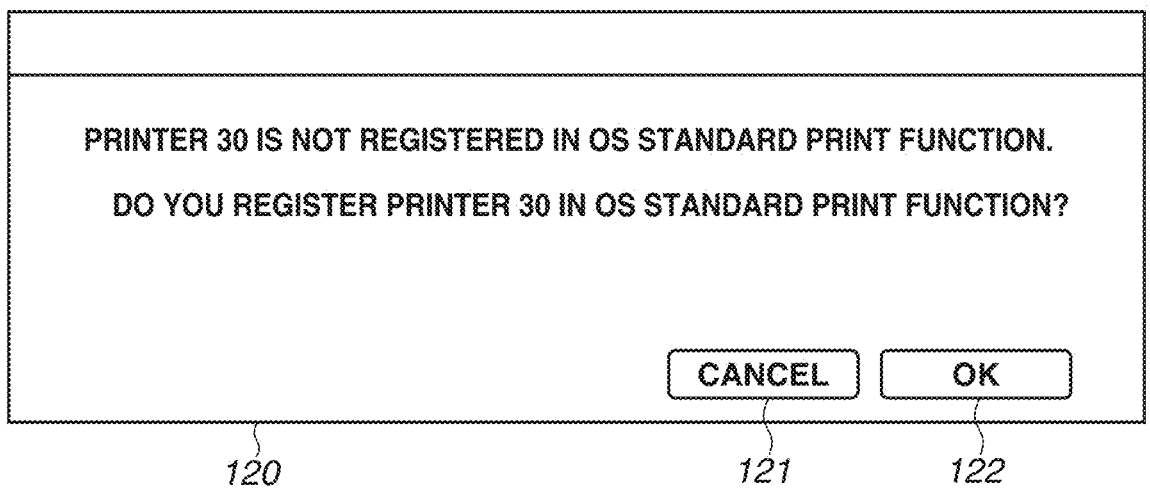
FIG. 8 is a diagram illustrating a guide dialog provided by the print conversion utility.

In step S27, the print conversion utility 08 receives a user selection in the guide dialog 120 in FIG. 8. In step S28, the print conversion utility 08 determines whether an "OK" button 122 is pressed. In a case where the "OK" button 122 is pressed (YES in step S28), then in step S29, the print conversion utility 08 registers the print queue 05 of the target printer for the OS standard print function in the OS print system 03. Specifically, the print conversion utility 08 notifies the OS print system 03 of the device URI of the n-th printer and instructs the OS print system 03 to register a print queue of the n-th printer. By this processing, the print queue (e.g., the print queue 05) of the n-th printer is registered in the OS print system 03. That is, the print conversion utility 08 displays a screen for checking whether the n-th printer is to be registered in the OS print system 03. Then, if the user gives an instruction to register the n-th printer on this checking screen, the print conversion utility 08 issues to the OS print system 03 an instruction to register the print queue of the n-th printer in the OS print system 03.

Meanwhile, in a case where it is determined in step S28 that a "cancel" button 121 is pressed (NO in step S28), then in step S30, the print conversion utility 08 inquires whether the print queue 10 of the target printer for the print conversion utility 08 is to be deleted. Specifically, the print conversion utility 08 displays a guide dialog 130 in FIG. 9.

Figure 9:
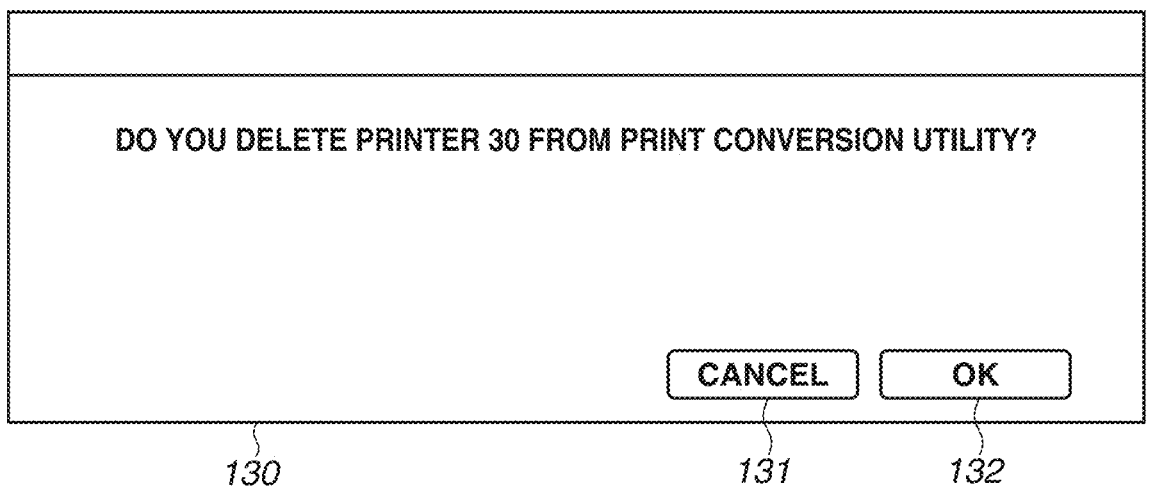
FIG. 9 is a diagram illustrating a guide dialog provided by the print conversion utility.

In step S31, the print conversion utility 08 receives a user selection in the guide dialog 130 in FIG. 9. In step S32, the print conversion utility 08 determines whether an "OK" button 132 is pressed. In a case where it is determined that the "OK" button 132 is pressed (YES in step S32), then in step S33, the print conversion utility 08 deletes the print queue 10 for the print conversion utility 08 of the n-th printer. That is, the print conversion utility 08 excludes the n-th printer managed as a management target from management targets.

Figure 10:
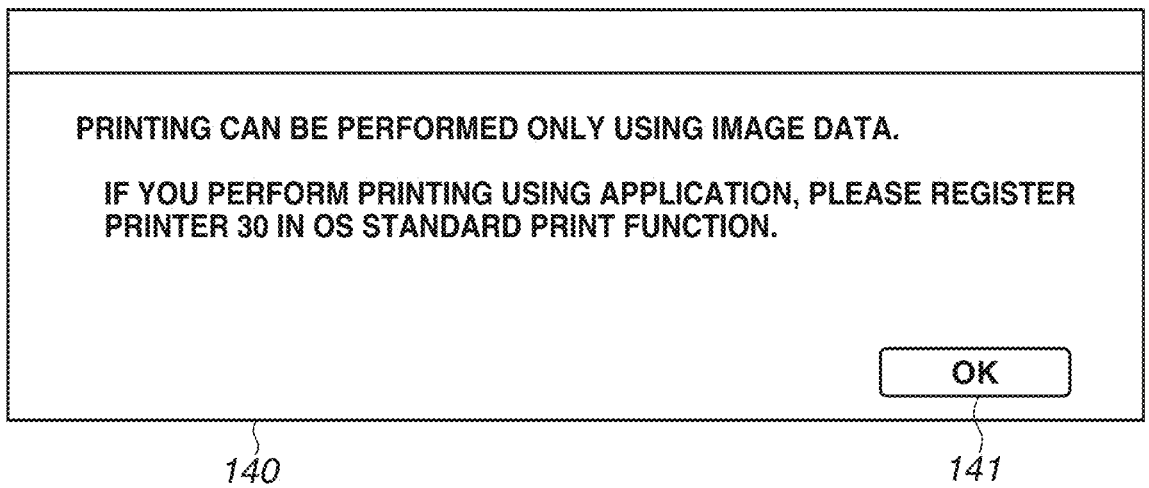
FIG. 10 is a diagram illustrating a guide dialog provided by the print conversion utility.

Meanwhile, in a case where it is determined in step S32 that a "cancel" button 131 is pressed (NO in step S32), then in step S34, the print conversion utility 08 notifies the user that printing can be performed only from the image data 07 specified using the "file printing" screen 70 in FIG. 2. Specifically, the print conversion utility 08 displays a guide dialog 140 in FIG. 10. If the user presses an "OK" button 141 in the guide dialog 140, the processing proceeds to step S35. Alternatively, a "cancel" button may be displayed in the guide dialog 140 in FIG. 10. If the "cancel" button is pressed in the guide dialog 140, the print conversion utility 08 may execute the processing from step S26 again. After step S35 is completed, the processing returns from step S36 to step S24 in FIG. 7. In step S24, the above processing is performed on the next target printer.

As described above, in a case where the print queue 05 of an unsupported printer managed by the print conversion utility 08 is not registered in the OS print system 03, the print conversion utility 08 automatically registers the print queue 05 in the OS print system 03. According to the present exemplary embodiment, convenience of the registering operation for the print queue 05 in the OS print system 03 can be improved. If the user does not choose to register the print queue 05, the print queue 10 for the print conversion utility 08 is deleted. If the print queue 10 for the print conversion utility 08 is not deleted, the user is notified that printing can be performed using the image data 07 specified on the "file printing" screen 70 in FIG. 2. By the above processing, operation burden on the user relating to the print queue 10 for the print conversion utility 08 can be reduced.

Next, a third exemplary embodiment of the present invention is described. In the present exemplary embodiment, a description is given of a process for preventing the print queue 05 for the OS standard print function from remaining after the print queue 10 is deleted from the print conversion utility 08. Specifically, the print conversion utility 08 guides the user to delete the print queue 05 for the OS standard print function. In the present exemplary embodiment, the differences from the above exemplary embodiments are described.

Figure 11:
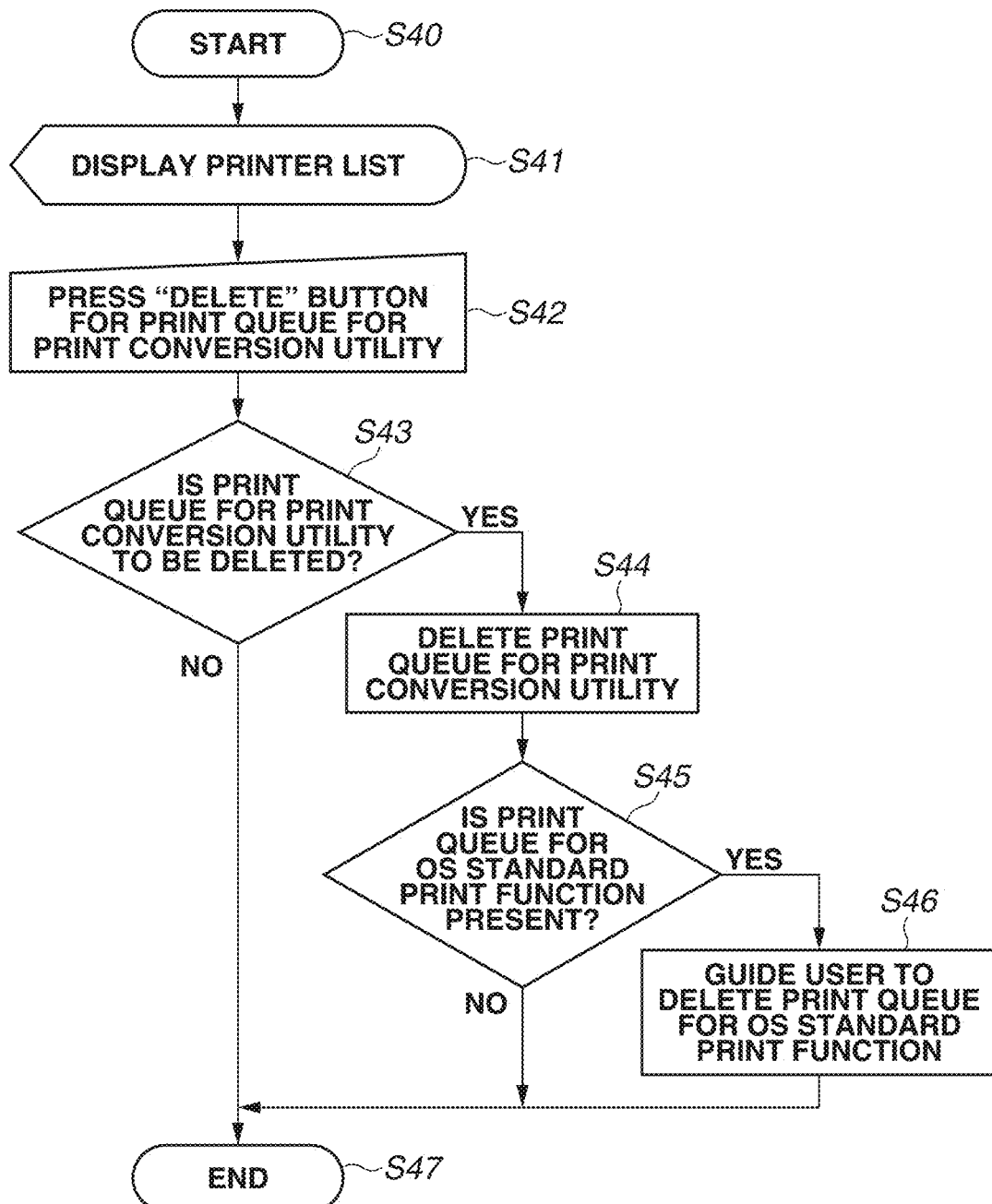
FIG. 11 is a flowchart illustrating an operating process of a print conversion utility.

FIG. 11 is a flowchart illustrating the operating process of the print conversion utility 08 according to the present exemplary embodiment. In step S41, the print conversion utility 08 displays printers currently registered in the print conversion utility 08 on the "printer list" screen 50. In step S42, in a case where detecting that the user presses the "delete" button 55 for a printer selected on the "printer list" screen 50, then in step S43, the print conversion utility 08 displays the guide dialog 130 in FIG. 9. In a case where the print conversion utility 08 determines that the user presses the "OK" button 132 in the guide dialog 130 (YES in step S43), then in step S44, the print conversion utility 08 deletes the print queue 10 of the printer selected on the "printer list" screen 50, and the processing proceeds to step S45. In step S45, the print conversion utility 08 determines whether the print queue 05 for the OS standard print function corresponding to the printer deleted in step S44 is present in the OS print system 03. Step S45 is achieved as follows. For example, the print conversion utility 08 acquires the device URIs of all print queues registered in the OS print system 03 from the OS print system 03. Then, the print conversion utility 08 determines whether the device URI of the printer selected as the deletion target is included in the device URIs acquired from the OS print system 03.

Figure 12:
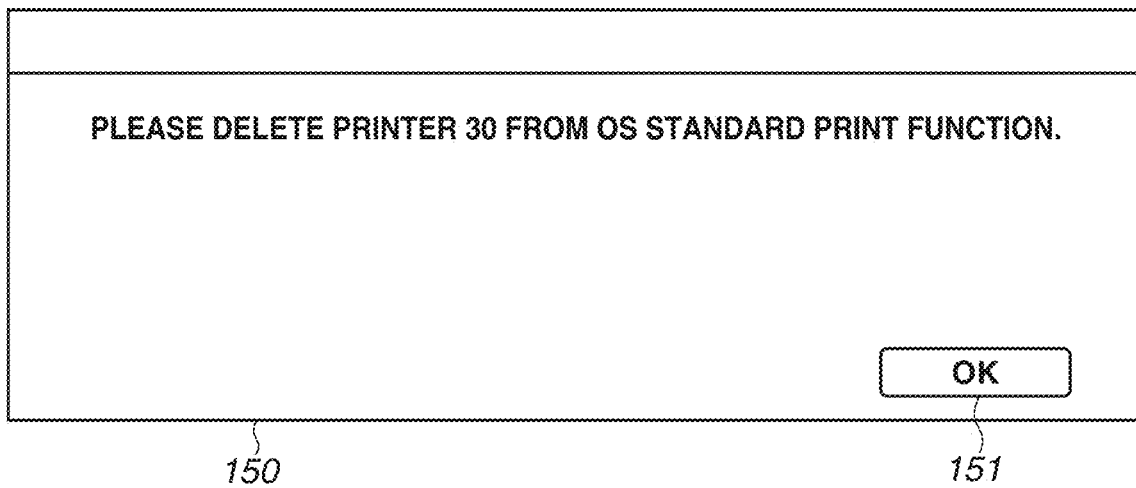
FIG. 12 is a diagram illustrating a guide dialog provided by the print conversion utility.

In a case where the print queue 05 for the OS standard print function is present in the OS print system 03 (YES in step S45), then in step S46, the print conversion utility 08 guides the user to delete the print queue 05 for the OS standard print function. Specifically, the print conversion utility 08 displays a guide dialog 150 for the OS standard print function in FIG. 12. In a case where the user presses an OK button 151 in the guide dialog 150, the print conversion utility 08 closes the guide dialog 150. That is, if the print queue 10 of an unsupported printer is deleted (removed from management targets), the print conversion utility 08 executes a process for excluding information (the print queue 05) about the printer from the OS print system 03.

As described above, in the present exemplary embodiment, when the user deletes the print queue 10 registered in the print conversion utility 08, the user is guided to delete the print queue 05 for the OS standard print function corresponding to a printer as a deletion target. Thus, the user can easily delete the print queue 05 for the OS standard print function.

Figure 13:
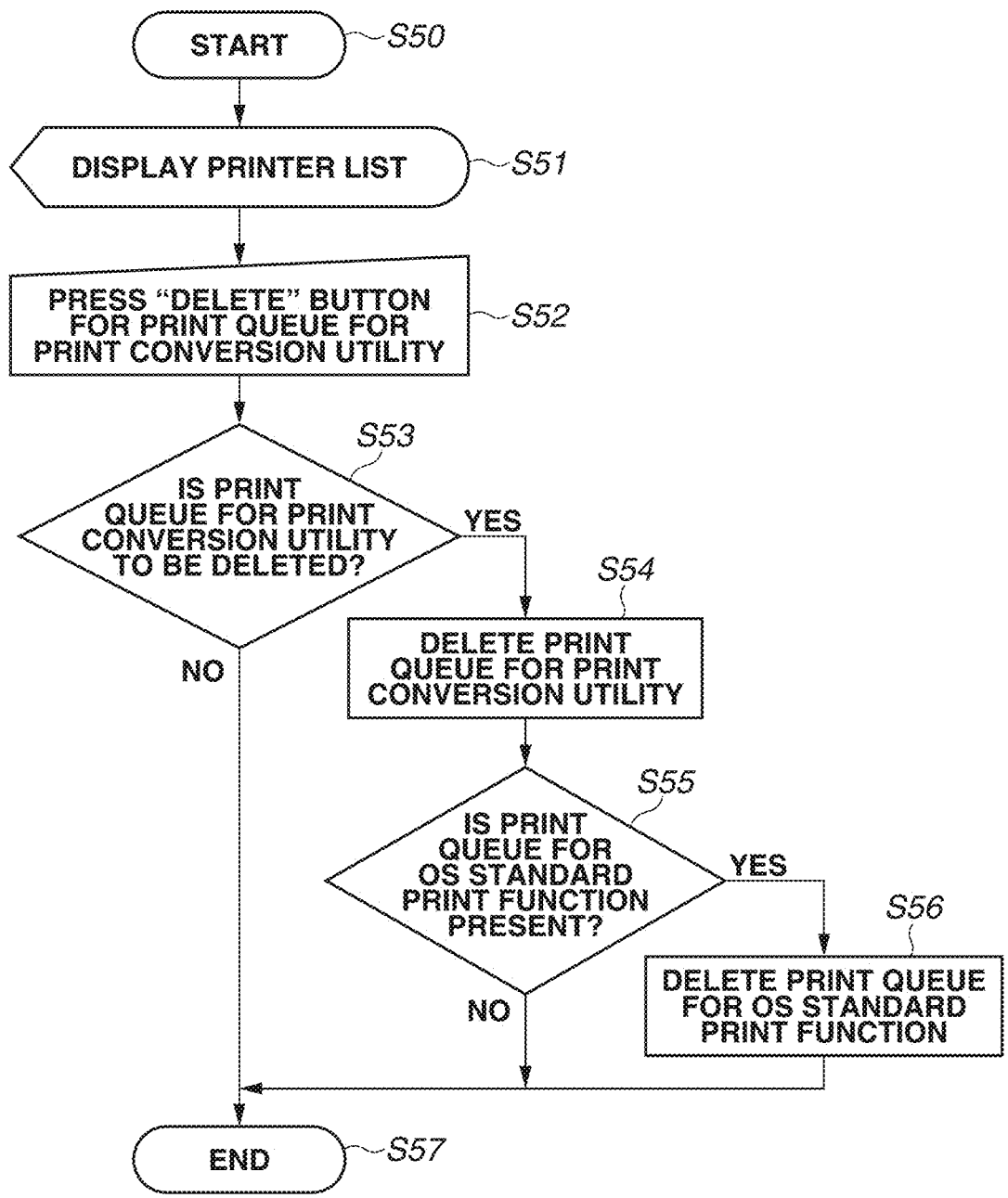
FIG. 13 is a flowchart illustrating an operating process of a print conversion utility.

Next, a fourth exemplary embodiment of the present invention is described. In the third exemplary embodiment, in a case where the print queue 10 is deleted from the print conversion utility 08, the user is guided to delete the print queue 05 for the OS standard print function corresponding to the deleted print queue 10. In the present exemplary embodiment, when the print queue 10 for the print conversion utility 08 is deleted, the print conversion utility 08 automatically deletes the print queue 05 for the OS standard print function corresponding to the deleted print queue 10. That is, the user is not guided to delete the print queue 05 for the OS standard print function. In the present exemplary embodiment, the differences from the above exemplary embodiments are described. FIG. 13 is a flowchart illustrating the operating process of the print conversion utility 08 according to the present exemplary embodiment. Steps S50 to S55 and S57 are similar to steps S40 to S45 and S47, respectively, in FIG. 11, and therefore are not described.

In a case where it is determined in step S55 that the print queue 05 for the standard print function corresponding to the deleted print queue 10 is present (YES in step S55), the processing proceeds to step S56, in step S56, the print conversion utility 08 deletes the print queue 05 for the OS standard print function corresponding to the deleted print queue 10. Specifically, the print conversion utility 08 transmits the printer name of the deletion target printer and an instruction to delete the print queue 05 of the deletion target printer to the OS print system 03. By this processing, the print queue 05 of a printer as a deletion target is deleted from the OS print system 03. Although the process of deleting the print queue 05 is described in the present exemplary embodiment, the print queue 05 may only need to be removed from management targets of the OS print system 03. Thus, the print conversion utility 08 may instruct the OS print system 03 to remove the print queue 05 from the management targets. That is, if the print queue 10 of an unsupported printer is deleted (removed from management targets), the print conversion utility 08 executes a process for excluding information (the print queue 05) about the printer from the OS print system 03.

As described above, in the present exemplary embodiment, when the user deletes the print queue 10 registered in the print conversion utility 08, the print queue 05 for the OS standard print function corresponding to the deleted print queue 10 is automatically deleted. Thus, a user operation for deleting the print queue 05 is reduced.

Figure 14:
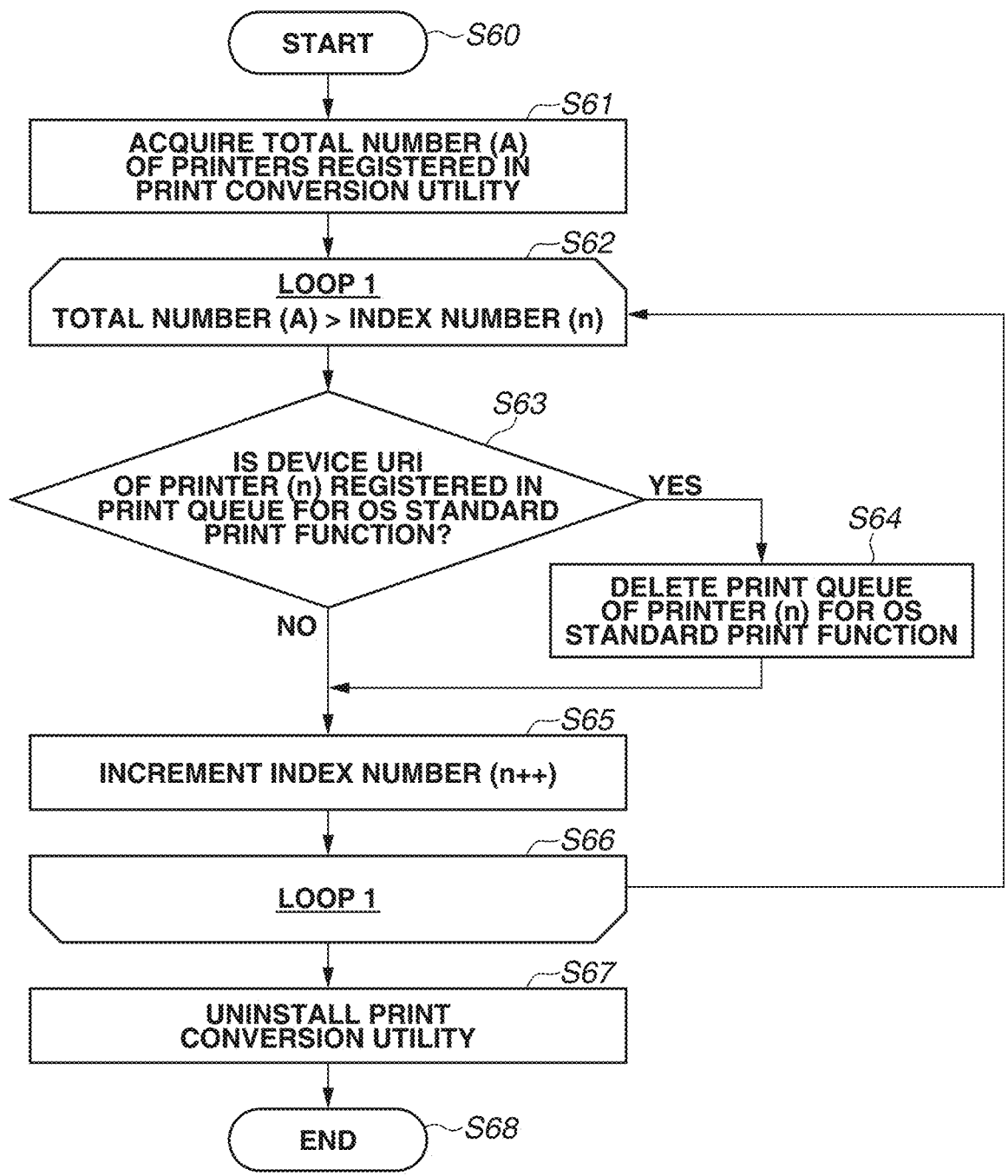
FIG. 14 is a flowchart illustrating an operating process of an uninstaller.

Next, a fifth exemplary embodiment of the present invention is described, in the present exemplary embodiment, a description is given of a form in which, when the print conversion utility 08 is uninstalled, the print queue 05 for the OS standard print function corresponding to a printer to which print data is transmitted via the print conversion utility 08 is deleted. In the present exemplary embodiment, the differences from the above exemplary embodiments are described, FIG. 14 is a flowchart illustrating the operating process of the uninstaller 11 for the print conversion utility 08 according to the present exemplary embodiment. If the user starts the uninstaller 11 for the print conversion utility 08, the processing proceeds to step S60. In step S60, the operating process is started.

In step S61, the uninstaller 11 acquires the total number (A) of printers registered in the print conversion utility 08. In step S62, the uninstaller 11 starts as many loops as the total number of printers. In step S63, the uninstaller 11 determines whether the device URI of an n-th printer is registered in the print queue 05 for the OS standard print function. Step S63 is achieved as follows. For example, the uninstaller 11 acquires the device URIs of all print queues registered in the OS print system 03 from the OS print system 03. Then, the uninstaller 11 determines whether the device URI of the n-th printer is included in the device URIs acquired from the OS print system 03.

In a case where the uninstaller 11 determines that the print queue 05 for the OS standard print function corresponding to the n-th printer is registered (YES in step S63), then in step S64, the uninstaller 11 deletes the print queue 05 for the OS standard print function of the printer (n). After the processing in step S64 is executed or in a case where the determination is NO in step S63, the processing proceeds to step S65 in FIG. 14.

The above processing is repeatedly executed as many times as the acquired total number of printers. If a loop 1 is completed, the processing proceeds to step S67. In step S67, the uninstaller 11 uninstalls the print conversion utility 08.

As described above, in the present exemplary embodiment, when the print conversion utility 08 is uninstalled, the uninstaller 11 deletes the print queue 05 for the OS standard print function corresponding to a printer to which print data is transmitted via the print conversion utility 08. By this processing, remaining of an unnecessary print queue 05 for the OS standard print function can be reduced.

Other Exemplary Embodiments

The present invention is achieved also by supplying software (a program) for achieving the functions of the above exemplary embodiments to a system or an apparatus via a network or various storage media, and by causing a computer of the system or the apparatus to read and execute the program. In this case, the program and a storage medium in which the program is stored constitute the present invention. The computer of the system or the apparatus is, for example, a CPU or a microprocessor unit (MPU).

According to the present invention, the operability of a print operation using a printer incapable of interpreting print data in a predetermined format supported by an OS standard print function can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Applications No. 2018-225254, filed Nov. 30, 2018, and No. 2018-225255, filed Nov. 30, 2018, which are hereby incorporated by reference herein in their entirety.

What is claimed is:

1. An information processing apparatus comprising:
at least one processor configured to cause the information processing apparatus to act as:
a registration unit configured to register a print queue of a printing apparatus connected to the information processing apparatus in print conversion software that generates second print data based on first print data generated by operating system (OS) standard print software, wherein the OS standard print software generates the first print data in a predetermined format based on an instruction from an application;
a reception unit configured to receive the first print data in the predetermined format via the OS standard print software;

a generation unit configured to generate the second print data in another format different from the predetermined format based on the first print data; and a control unit configured to perform, in a case where a registration state of a queue does not match between the print conversion software and the OS standard print software, either registration processing for causing a print queue to be registered or delete processing for causing a print queue to be deleted so that the registration state of the print queue matches between the print conversion software and the OS standard print software.

2. The information processing apparatus according to claim 1, wherein in a case where a first print queue of the printing apparatus is registered in the print conversion software and a second print queue corresponding to the first print queue is not registered in the OS standard print software, the control unit performs the registration processing for causing the second print queue to be registered in the OS standard print software.

3. The information processing apparatus according to claim 2,
wherein, in the case where the first print queue of the printing apparatus is registered in the print conversion software and the second print queue is not registered in the OS standard print software, a screen is displayed for accepting a user instruction, and
wherein, in a case where the screen accepts a user instruction for registering the second print queue in the OS standard print software, the control unit performs the registration processing.

4. The information processing apparatus according to claim 2, wherein, as the registration processing, the control unit instructs the OS standard print software to register the second print queue in the OS standard print software.

5. The information processing apparatus according to claim 1, wherein, in a case where a first print queue of the printing apparatus is not registered in the print conversion software by deleting the first print queue from the print conversion software and a second print queue corresponding to the first print queue is registered in the OS standard print software, the control unit performs the delete processing for causing the second print queue to be deleted from the OS standard print software.

6. The information processing apparatus according to claim 5, wherein, as the delete processing, the control unit instructs the OS standard print software to delete the second print queue from the OS standard print software.

7. A control method executed by at least one processor in an information processing apparatus, the control method comprising:
registering a print queue of a printing apparatus connected to the information processing apparatus in print conversion software that generates second print data based on first print data generated by OS standard print software, wherein the OS standard print software generates the first print data in a predetermined format based on an instruction from an application;
receiving the first print data in the predetermined format via the OS standard print software;
generating the second print data in another format different from the predetermined format based on the first print data; and
performing, in a case where a registration state of a queue does not match between the print conversion software and the OS standard print software, either registration processing for causing a print queue to be registered or delete processing for causing a print queue to be deleted so that the registration state of the print queue matches between the print conversion software and the OS standard print software.

8. The control method according to claim 7, wherein in a case where a first print queue of the printing apparatus is registered in the print conversion software and a second print queue corresponding to the first print queue is not registered in the OS standard print software, the registration processing for causing the second print queue to be registered in the OS standard print software is performed.

9. The control method according to claim 8,
wherein, in the case where the first print queue of the printing apparatus is registered in the print conversion software and the second print queue is not registered in the OS standard print software, a screen is displayed for accepting a user instruction, and
wherein, in a case where the screen accepts a user instruction for registering the second print queue in the OS standard print software, the registration processing is performed.

10. The control method according to claim 8, wherein as the registration processing, the OS standard print software is instructed to register the second print queue in the OS standard print software.

11. The control method according to claim 8, wherein the first print queue is registered in the print conversion software and the second print queue is registered in the OS standard print software, thereby the first print data in the predetermined format generated by the OS standard print software is received by the print conversion software and the second print data in the other format is generated by the print conversion software.

12. The control method according to claim 7, wherein, in a case where a first print queue of the printing apparatus is not registered in the print conversion software by deleting the first print queue from the print conversion software and a second print queue corresponding to the first print queue is registered in the OS standard print software, the delete processing for causing the second print queue to be deleted from the OS standard print software is performed.

13. The control method according to claim 12, wherein, as the delete processing, the OS standard print software is instructed to delete the second print queue from the OS standard print software.

14. The control method according to claim 7, wherein, in a case where a first print queue of the printing apparatus is registered in the print conversion software and a second print queue corresponding to the first print queue is not registered in the OS standard print software, the delete processing for causing the first print queue to be deleted from the print conversion software is performed.

15. The control method according to claim 7, wherein the printing apparatus is a printing apparatus incapable of interpreting the first print data in the predetermined format to be generated by the OS standard print software.

16. A non-transitory computer-readable storage medium storing a program including instructions, which when executed by at least one processor in an information processing apparatus, cause the information processing apparatus to perform a control method comprising:
registering a print queue of a printing apparatus connected to the information processing apparatus in print conversion software that generates second print data based on first print data generated by OS standard print software, wherein the OS standard print software generates the first print data in a predetermined format based on an instruction from an application;

receiving the first print data in the predetermined format via the OS standard print software;

generating the second print data in another format different from the predetermined format based on the first print data; and performing, in a case where a registration state of a queue does not match between the print conversion software and the OS standard print software, either registration processing for causing a print queue to be registered or delete processing for causing a print queue to be deleted so that the registration state of the print queue matches between the print conversion software and the OS standard print software.

* * * * *